March 24, 1959     K. J. H. OHLSSON     2,878,586
HOME PLANNING KIT
Filed Oct. 24, 1956     2 Sheets-Sheet 1
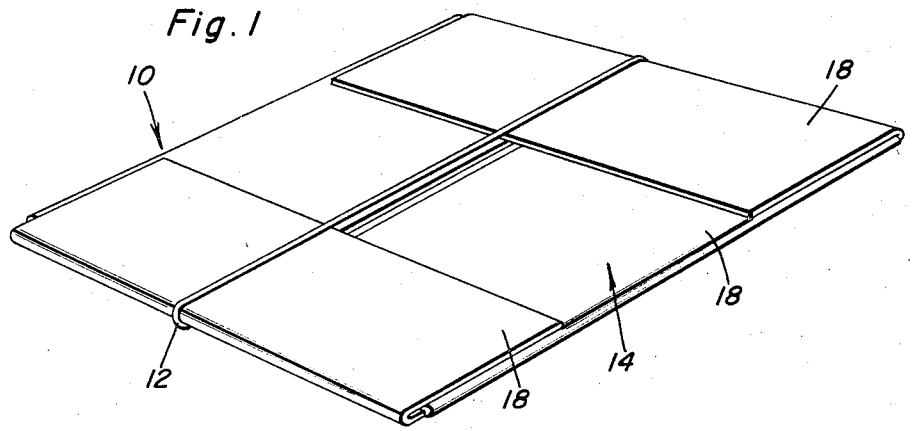
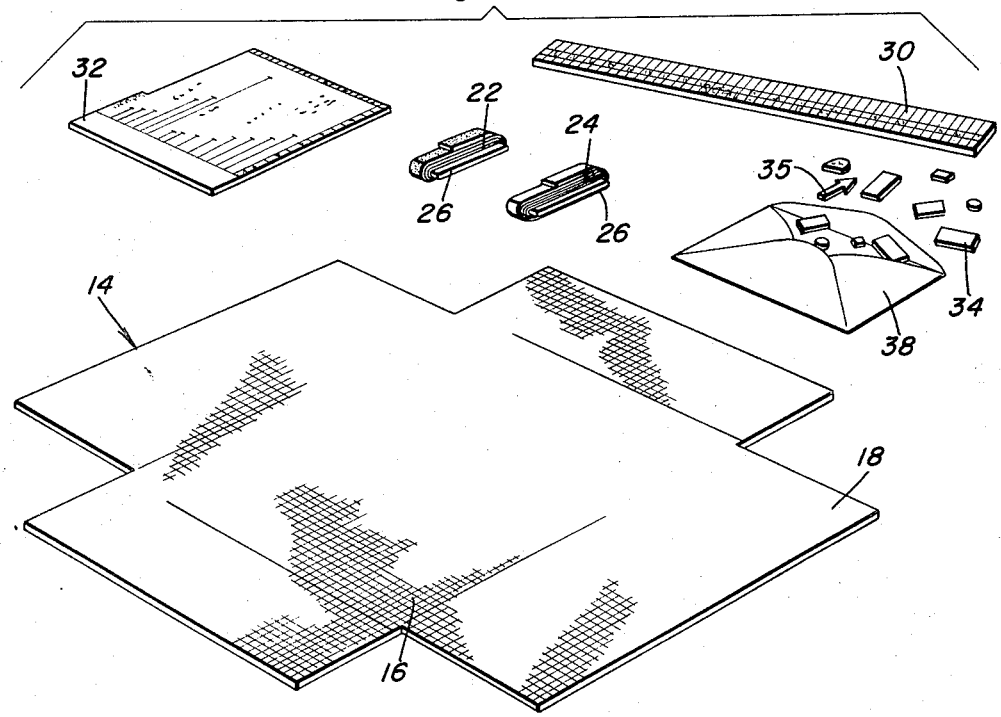
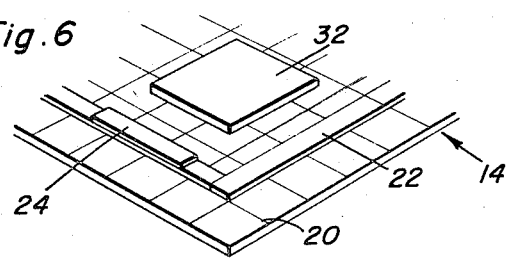
Knut J. H. Ohlsson
INVENTOR.

March 24, 1959   K. J. H. OHLSSON   2,878,586
HOME PLANNING KIT
Filed Oct. 24, 1956   2 Sheets-Sheet 2
Fig. 3
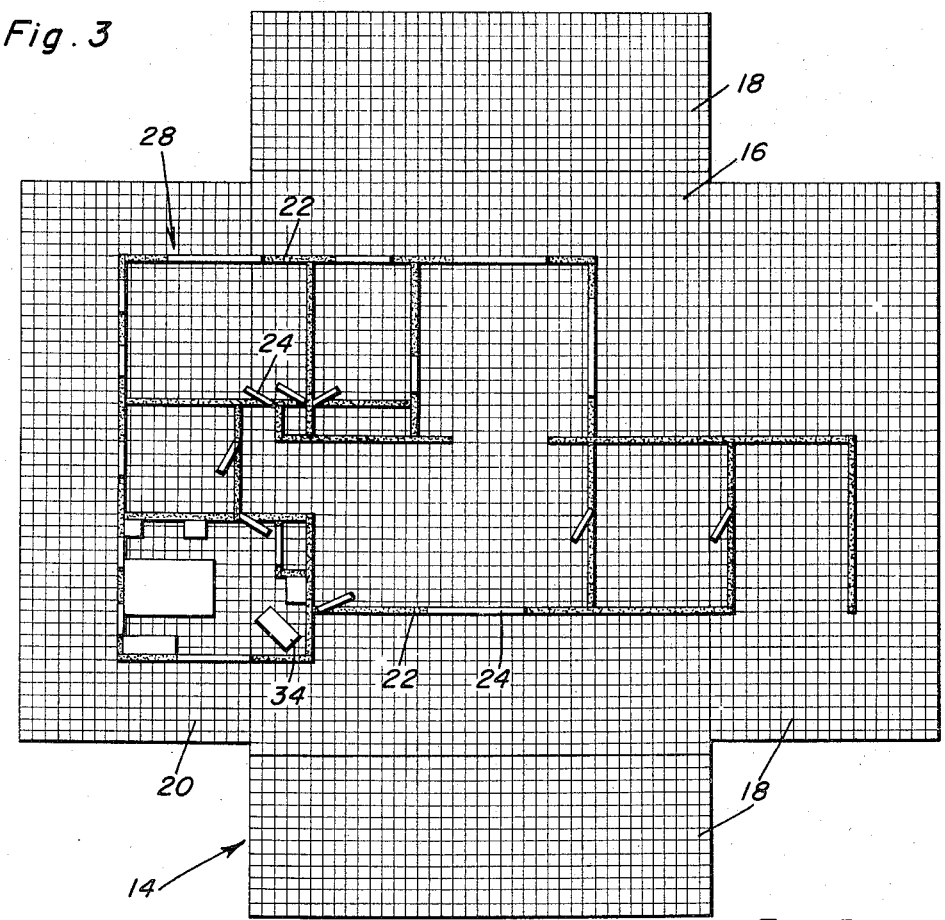
Fig. 4
Fig. 5
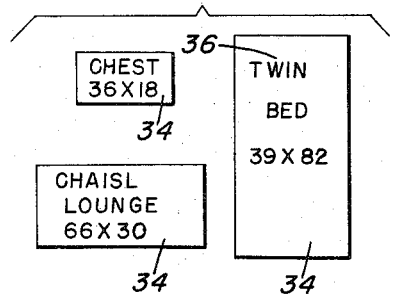
Knut J. H. Ohlsson
INVENTOR.
BY Clarence A. O'Brien
and Harvey B. Jacobson
Attorneys

United States Patent Office 2,878,586
Patented Mar. 24, 1959

2,878,586

HOME PLANNING KIT

Knut J. H. Ohlsson, Brockton, Mass.

Application October 24, 1956, Serial No. 618,028

1 Claim. (Cl. 35—16)

This invention generally relates to a device for facilitating the planning of a home and includes a package containing all of the necessary structural elements constructed in such a manner so that the laying out or furnishing of a home, a particular room thereof or any other similar living space is provided to scale thus permitting the visualization of such a room.

In the furnishing or planning of a home or any other living quarters, it is quite frequently desired to make various alterations, changes and rearrangements. If each arrangement is separately drawn to scale by an architect or other persons qualified to make such drawings, it is a time consuming and expensive operation. Therefore, it is the primary object of the present invention to provide a home planning kit especially adapted for the layman that does not require any drafting instruments or devices of this nature in that all of the necessary utensils are provided in such a manner that they will facilitate the layout or planning of any desired area.

Other objects of the present invention will reside in its simplicity of construction, compactness in its arrangement, adaptation for its particular purposes and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the home planning kit of the present invention in a compact folded condition;

Figure 2 is a group perspective view of the elements contained in the home planning kit;

Figure 3 is a plan view of a typical layout employing the home planning kit of the present invention;

Figure 4 is a plan view of a scale or guide illustrating various standard door widths, window widths or the like which are drawn to a scale;

Figure 5 is a plan view of a group of typical simulated furniture pieces constructed to the same scale as the master layout board; and Figure 6 is a partial perspective view illustrating the details of the arrangement of the elements on the layout board.

Referring now specifically to the drawings, the numeral 10 generally designates the home planning kit of the present invention which is shown in Figure 1 in a folded compact condition and held together in such a compact condition by an encircling rubber band 12.

Figure 2 illustrates an exploded group perspective view of the elements of the invention which includes a layout board generally designated by the numeral 14 and having an enlarged square central portion 16 with a flap 18 hingedly connected to each side thereof wherein the opposed side flaps may be folded inwardly after which the opposed end flaps may be folded inwardly and the rubber band 12 disposed in the position illustrated in Figure 1 for retaining the layout board 14 substantially in the form of an enlarged envelope for retaining the other elements of the invention.

The layout board has equally spaced horizontal and vertical lines 20 disposed thereon which are laid out to a scale of one-quarter inch to the foot to serve as the layout medium for the plan of a house, motel, cabin, farmstead, restaurant or any other similar dwelling or facility.

Provided in the kit is a supply of adhesive tape 22 preferably of dark color such as black and also a supply of adhesive tape 24 of a lighter color such as red. The adhesive tape is one-eighth inch wide and is to a scale to represent six inch building walls. The adhesive tapes 22 and 24 are wound upon their own flat dispensers 26 thus providing a relatively flat roll of tape. This material when laid out on the master layout board 14 as illustrated in Figure 3 forms an outline to scale of a house or other building generally designated by the numeral 28. The black adhesive tape 22 represents the walls of the house 28 while the red or light colored adhesive tape 24 represents the windows and doors. The adhesive tapes 22 and 24 may be altered at will during the layout procedure thus giving to the user the effect of many alternate plans as to space utilization, locations, wall, door and window relationships, symmetry, etc.

A scale such as a ruler 30 is provided which is laid out to the scale of one-quarter inch to the foot which is similar to the layout of the vertical and horizontal lines 20 is provided to facilitate measurement of the various walls and partitions to scale. A second scale 32 is provided which illustrates a plurality of standard widths of American doors and windows which are used to aid in cutting the red tapes to proper length. This permits the use of scaled door and window widths inasmuch as the scale 32 is constructed on the same scale as the layout board. A plurality of templates or cutouts of ordinary furniture 34 as illustrated in Figure 5 is provided and such pieces of furniture 34 are identified and constructed to the same scale as the layout board. As an example, the twin bed is labeled and the size thereof is set forth by indicia 36 thereon. Once the house or room or other space facility has been laid out, using the layout board and tapes, the furniture templates may be laid in place in the pattern desired. Various colors may identify different rooms. The templates 34 may include ordinary furniture found in the various rooms and also the major home appliances found in certain rooms. These templates 34 may be stored in an envelope 38 and a set of instructions may be incorporated and contained in the same envelope 38 wherein the scale 30, scale 32, tapes 22 and 24 and the envelope 38 with the templates 34 therein may be disposed on the upper surface of the central portion 16 of the layout board 14 after which the flaps 18 may be folded over for compact storage. Figure 3 illustrates a typical layout of the device employed in planning the arrangement of a home.

Briefly, the device operates as follows: Take the rubber band from around the kit and open four flaps of the layout board and lay the board flat on a table or other flat surface. Remove tapes, scales, instructions and envelope containing furniture templates. Working from a home layout plan which may be found in magazines or newspapers or from a rough sketch or other outline or from some given room measurements, lay out the outer walls of the house using the dark adhesive type provided for this purpose. Apply the tape along one of the lines on the layout board counting the lines to arrive at proper lengths. The tapes and lines on the layout board being to the same scale will be of realistic inside house dimensions. Cut more tape to length, laying out rooms and related space requirements. Use red tape cutting windows and doors to dimension and use the scale provided for this purpose. The board illustrated will accommodate houses up to 70 feet long or slightly more in overall length. After the home or rooms are laid out the envelope may be opened and desired furniture and appliance cutouts may be selected which are also to the same scale and such templates or cutouts may be arranged in the layout. The device will provide easy visualization of the plan or layout and by altering the various features, the desired layout and the layout which most effectively uses the space available may be determined.

A plurality of directional arrows 35 may also be provided for adhesive attachment to the layout board for indicating the traffic flow in relation to the furniture and building walls and partitions. Since homes and other facility layouts are judged on traffic flow as well as other points, it is desirable to eliminate all possible objectional arrangement.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A device for laying out plans for a building such as a home comprising a generally flat board having a plurality of equally spaced parallel vertical and horizontal reference lines thereon with such reference lines being spaced to desired scale dimensions, distinguishably colored adhesive tape adapted to be positioned on said board for indicating the walls of the building, other distinguishable adhesive tape adapted to be positioned on the board for indicating wall openings such as windows and doors, arrows of adhesive tape indicating traffic flow in the building, furniture and appliance templates adapted to be movably positioned on the board for permitting arrangement of such furniture to the desired position within the area enclosed by said tape, said layout board including a square central portion with a hinged flap extending from each side thereof, said hinged flaps adapted to fold inwardly into overlying relation to the central portion thus providing an enlarged envelope for containing the loose elements of the device, said loose elements including the adhesive tape wound upon a roll, a ruler, and a scale for designating scaled window and door widths.

References Cited in the file of this patent
UNITED STATES PATENTS

| | | |
|---|---|---|
| 2,317,124 | Adams | Apr. 20, 1943 |
| 2,405,808 | Armbright | Aug. 13, 1946 |
| 2,610,413 | Dasey | Sept. 16, 1952 |

OTHER REFERENCES

"Cut-Outs" (U.S. Department of Agriculture), Miscellaneous Publication No. 622, May 1947), (pages 2, 11, 41 and 45 and inside back cover sufficient).